(12) United States Patent
Minami

(10) Patent No.: US 12,657,792 B2
(45) Date of Patent: Jun. 16, 2026

(54) IMAGE PROCESSING APPARATUS, IMAGE PROCESSING METHOD, AND STORAGE MEDIUM THAT EDIT DOCUMENT DATA INCLUDING AN IMAGE ON WHICH A CHARACTER OBJECT IS SUPERIMPOSED

(71) Applicant: CANON KABUSHIKI KAISHA, Tokyo (JP)

(72) Inventor: Yoshitaka Minami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 178 days.

(21) Appl. No.: 18/464,426

(22) Filed: Sep. 11, 2023

(65) Prior Publication Data

US 2024/0095985 A1     Mar. 21, 2024

(30) Foreign Application Priority Data

Sep. 16, 2022     (JP) ................................. 2022-148171

(51) Int. Cl.
*G06T 11/60*          (2026.01)
*G06F 40/166*         (2020.01)
(Continued)

(52) U.S. Cl.
CPC ............ *G06T 11/60* (2013.01); *G06F 40/166* (2020.01); *G06V 30/1801* (2022.01); *G06V 30/416* (2022.01); *G06T 2210/62* (2013.01)

(58) Field of Classification Search
CPC . G06T 2210/62; G06T 11/60; G06V 30/1801; G06V 30/413; G06V 30/416; G06F 40/166
See application file for complete search history.

(56) References Cited

U.S. PATENT DOCUMENTS

| | | | | |
|---|---|---|---|---|
| 5,978,519 A | * | 11/1999 | Bollman | .................... G06T 7/70 |
| | | | | 382/270 |
| 6,078,410 A | * | 6/2000 | Adachi | ................ H04N 1/4074 |
| | | | | 358/518 |

(Continued)

FOREIGN PATENT DOCUMENTS

| | | |
|---|---|---|
| JP | 2015138428 A | 7/2015 |
| JP | 2018-45621 A | 3/2018 |

OTHER PUBLICATIONS

Japanese Office Action issued Apr. 21, 2026, in related Japanese Patent Application No. 2022-148171, with English translation (6 pages).

*Primary Examiner* — Phi Hoang
(74) *Attorney, Agent, or Firm* — Venable LLP

(57)          ABSTRACT

An image processing method to edit document data including an image, on which a character object is superimposed, includes obtaining a candidate image group that includes one or more candidate images, each being a candidate of an image to be arranged in the document data, identifying, for each candidate image, a background region that is a background of the superimposed character object based on a size of the superimposed character object and a position of the superimposed character object when the candidate image is arranged in the document data, detecting an edge of the candidate image in the background region by using an edge filter, calculating a value related to an edge strength based on the detected edge, and displaying one or more images with the calculated value related to the edge strength that is less than a predetermined threshold. The images are included in the candidate image group.

17 Claims, 16 Drawing Sheets

(51) Int. Cl.
    *G06V 30/18*         (2022.01)
    *G06V 30/416*      (2022.01)

(56)           References Cited

U.S. PATENT DOCUMENTS

| | | | | |
|---|---|---|---|---|
| 6,148,033 | A * | 11/2000 | Pearlstein | H04N 19/428 |
| | | | | 375/E7.176 |
| 6,640,017 | B1 * | 10/2003 | Tsai | G06T 5/73 |
| | | | | 382/199 |
| 8,837,836 | B2 * | 9/2014 | Kondo | G06V 10/56 |
| | | | | 382/164 |
| 9,158,987 | B2 * | 10/2015 | Kondo | G06V 30/414 |
| 2013/0135298 | A1 * | 5/2013 | Isogai | G06T 15/205 |
| | | | | 345/419 |
| 2016/0125614 | A1 * | 5/2016 | Chen | G06T 7/13 |
| | | | | 345/620 |
| 2021/0383163 | A1 * | 12/2021 | Ma | G06V 30/413 |

* cited by examiner

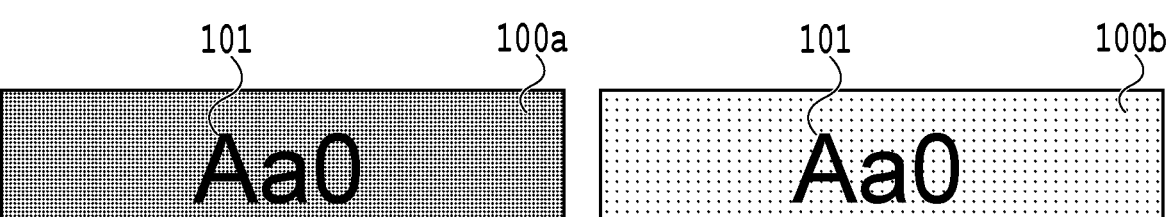
FIG.1A          FIG.1B
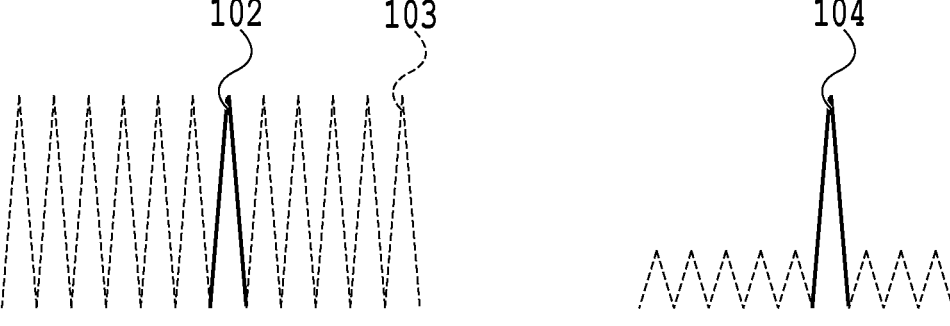
FIG.1C          FIG.1D

START

OBTAIN TARGET REGION — S501

OBTAIN LAYOUT INFORMATION — S502

OBTAIN CANDIDATE IMAGE GROUP — S503

CALCULATE BACKGROUND REGION — S504

DETECT EDGE — S505

CALCULATE EVALUATION VALUE — S506

SELECT IMAGE — S507

S508 — DONE FOR ALL CANDIDATE IMAGES ?

NO

YES

DISPLAY SELECTED IMAGE — S509

END

IMAGE PROCESSING APPARATUS, IMAGE PROCESSING METHOD, AND STORAGE MEDIUM THAT EDIT DOCUMENT DATA INCLUDING AN IMAGE ON WHICH A CHARACTER OBJECT IS SUPERIMPOSED

CROSS-REFERENCE TO PRIORITY APPLICATION

This application claims the benefit of Japanese Patent Application No. 2022-148171, filed Sep. 16, 2022, which is hereby incorporated by reference herein in its entirety.

BACKGROUND OF THE INVENTION

Field of the Invention

The present disclosure relates to an image processing technique to edit document data in which a character object can be superimposed on an image.

Description of the Related Art

For a case when document data, such as a photo book is created by using a template in which a layout of superimposed contents, is defined, there has been known an image selection method to select a background image taking into consideration the superimposition of contents from a candidate image group. For example, Japanese Patent Laid-Open No. 2018-45621 discloses a method of detecting an object appropriate for a theme of a photo book from candidate images and selecting a background image based on an evaluation value related to an image quality of the object and a set evaluation criterion. Thus, an image optimal for the background image of the photo book is selected.

However, in the conventional technique, in a case when a character object is superimposed on the background image, the visibility of the character object has not been taken into consideration. The visibility of the character object may be reduced depending on an edge strength of an image region as a background of the character object, and it has been impossible to select the background image optimally only with the evaluation criterion related to the image quality.

SUMMARY OF THE INVENTION

An aspect according to an embodiment of the present disclosure is an image processing method to edit document data including an image on which a character object is superimposed, including obtaining a candidate image group that includes one or more candidate images each being a candidate of an image to be arranged in the document data, identifying, for each candidate image, as a background region a region that is a background of the superimposed character object in a case when the candidate image is arranged in the document data, detecting an edge of the candidate image in the background region and identifying a value related to an edge strength based on the detected edge, and selecting as a selected image a candidate image with the value related to the edge strength of the background region that is smaller than a predetermined threshold.

Further features of the present invention will become apparent from the following description of exemplary embodiments with reference to the attached drawings.

BRIEF DESCRIPTION OF THE DRAWINGS

FIGS. 1A to 1D are diagrams describing a visibility reduction in a character object caused by an edge;

DESCRIPTION OF THE EMBODIMENTS

Figure 2:
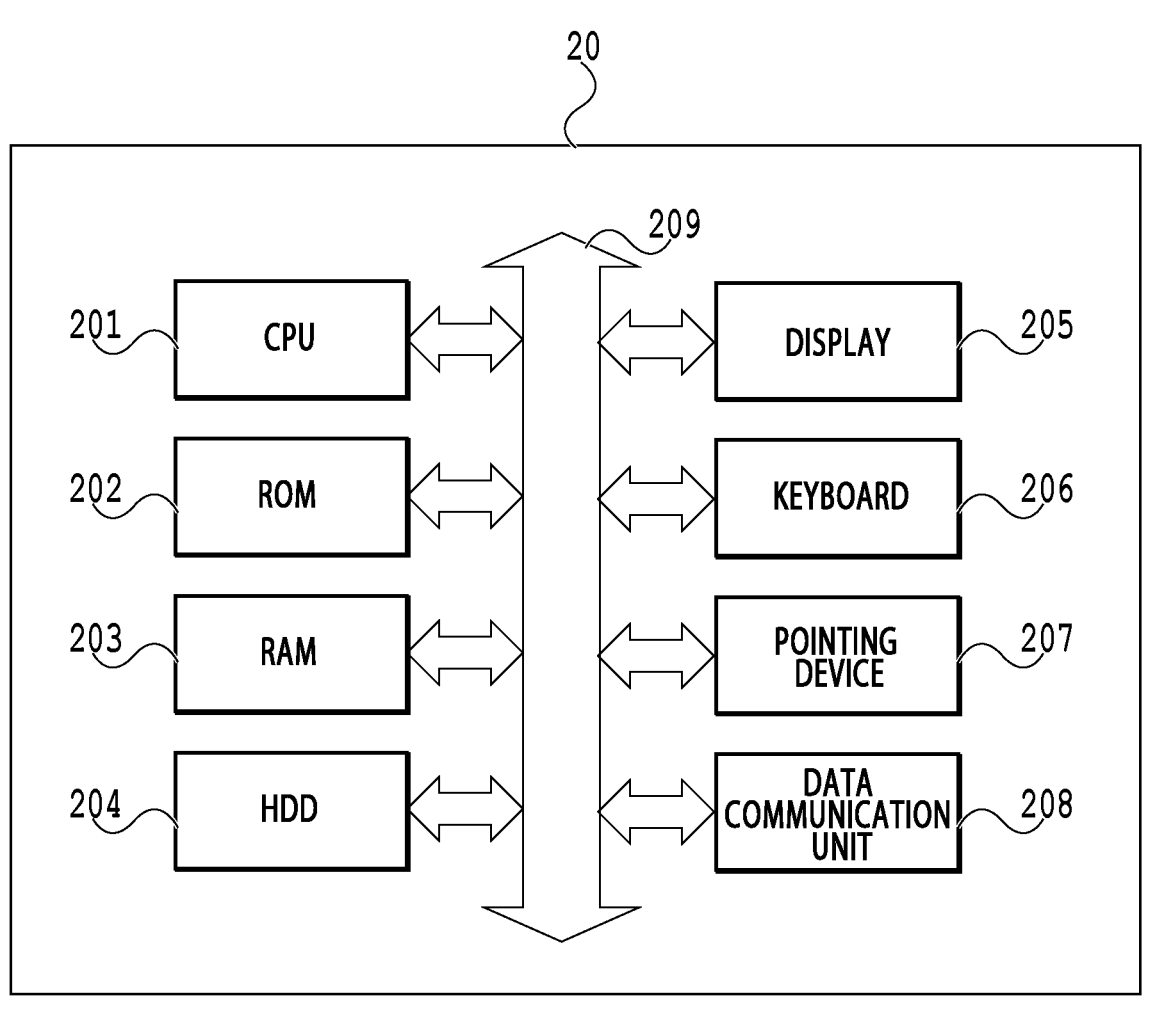
FIG. 2 is a block diagram illustrating a configuration of an image processing apparatus according to a first embodiment of the present disclosure.

Embodiments of the present disclosure are described below in detail with reference to the drawings.

First Embodiment

In a first embodiment, here is described an example in which only an image with a small evaluation value, which is based on an edge detected in an image region as a background of a character object, is selected from a candidate image group to be arranged in document data, and a selection result is displayed to a user. An image processing apparatus according to the first embodiment obtains the document data in editing and the candidate image group as a candidate to be arranged in this document data. Next, the image region that is the background of the character object in a case when a candidate image of the obtained candidate image group is arranged in the document data is calculated. Additionally, the edge of the image region as the background is detected, and the evaluation value based on the detected edge, which is described later, is used to select the candidate image in which the visibility of the superimposed character object is not reduced. At last, the selected image is outputted to an output region on an application. In this case, the character object indicates a general object that can be identified as a character. This is not limited to a text and font data and may be outlined or rasterized graphic data.

(Visibility Reduction in Character Object Caused by Edge)

The visibility reduction in the character object caused by the edge is described with reference to FIGS. 1A to 1. FIGS. 1A and 1B schematically illustrate a difference in the visibility due to a difference in the degree of the edge strength between image regions 100a and 100b as the background of the character object (hereafter, called background regions). In this case, the edge of an image indicates a portion in which a pixel value changes more rapidly than a pixel value of an adjacent pixel does, and a feature amount indicating a degree of the change in the pixel value is called the edge strength. As a method of detecting the edge, for example, the edge can be detected by obtaining the local maximum value by first derivative of a luminance value of one line in a horizontal direction of an image, or obtaining a zero-crossing point by second derivative. Additionally, the edge may be detected by using a common edge detection filter such as a Sobel filter. The edge strength can be expressed by a difference in the luminance value, the local maximum value of the first derivative, or the pixel value after filtering. Additionally, the edge strength of an image may be calculated from a detection result from specific one line in the horizontal direction, may be an average value obtained from detection results from arbitrary multiple lines, or may be expressed by the maximum value. Hereafter, the feature amount obtained based on the edge detected from the image is called an edge strength evaluation value. It can be seen that the visibility of a superimposed character object 101 is reduced more in the background region 100a with a great edge strength evaluation value than in the background region 100b with a small edge strength evaluation value.

FIGS. 1C and 1D schematically illustrate a difference in a profile due to a difference in the degree of the edge strength evaluation value of the background region of the character object. Solid lines 102 and 104 are each the edge strength evaluation value of the superimposed character object 101, and broken lines 103 and 105 are each the edge strength evaluation value of the background region. FIG. 1C is a profile of FIG. 1A. The edge strength evaluation value 103 of the background region 100a is great and is a strength comparable with the edge strength evaluation value 102 of the character object 101. Accordingly, the edge of the character object 101 is buried in the edge of the background region 100a, and it is difficult to distinguish the background region and the character object. FIG. 1D is a profile of FIG. 1B. The edge strength evaluation value 105 of the background region 100b is less than the edge strength evaluation value 104 of the character object 101. Accordingly, a strength difference occurs between the edges of the background region and the character object, and thus it is easy to distinguish the character object.

That is, it can be said that the greater edge strength of the background region than the edge strength of the character object is a cause of the reduction in the visibility of the superimposed character object. To deal with this, in a case when the character object is superimposed and arranged on the image in the document data, the character object is easily distinguished by selecting an image with a small edge strength evaluation value of the background region.

(Image Processing Apparatus)

FIG. 2 illustrates a configuration of the image processing apparatus according to the first embodiment of the present disclosure. An image processing apparatus 20 may include, for example, a personal computer (PC), a tablet terminal, a smartphone, and the like. In the first embodiment, the image processing apparatus is described as a PC, and the same applies to a second and following embodiments. The image processing apparatus 20 includes a central processing unit (CPU/processor) 201, a ROM 202, a RAM 203, a hard disk (HDD) 204, a display 205, a keyboard 206, a pointing device 207, and a data communication unit 208. The CPU 201 controls overall the image processing apparatus 20 and, for example, implements an operation of the present embodiment by reading a program stored in the ROM 202 to the RAM 203 to execute. In FIG. 2, there is only one CPU. However, multiple CPUs may be included.

The ROM 202 is a versatile ROM and, for example, stores the program to be executed by the CPU 201. The RAM 203 is a versatile RAM and is, for example, used as a working memory that temporarily stores various types of information in a case of the execution of the program by the CPU 201. The HDD 204 is a storage medium (a storage unit) that functions as a database that holds an image file and a processing result from image analysis, and the like.

The display 205 is a display unit that displays to the user a user interface (UI) of the present embodiment and an image selection result obtained by executing the program. The keyboard 206 and the pointing device 207 receive an instruction operation from the user. The display 205 may have a touch sensor function. The keyboard 206 and the pointing device 207 are used in a case when, for example, the user operates the UI displayed on the display 205. The data communication unit 208 establishes communication with an external device through a network that is wired, wireless, or the like. The data communication unit 208 communicates with an external website used by the user for image search and obtains a search result by the user as the candidate image group, for example. A data bus 209 connects the blocks illustrated in FIG. 2 so as to be mutually communicable.

The configuration illustrated in FIG. 2 is merely an example and is not limited thereto. For example, the image processing apparatus 20 may not include the display 205 and may display the UI on an external display.

(Software Blocks)

In a case when a program of a document creation application in the first embodiment is installed on the image processing apparatus 20, an activation icon of this application is displayed on a screen displayed by an operating system (OS) operating on the image processing apparatus 20. Once the user double-clicks the activation icon displayed on the display 205 with the pointing device 207, the program of the document creation application saved in the HDD 204 is loaded to the RAM 203. The program loaded to the RAM 203 is then executed by the CPU 201, and the document creation application is activated.

The above is details of a software configuration of the image processing apparatus 20 in the first embodiment. Note that, the application may be in another form and may be a web application that displays a screen, and the like, in a browser operated by the image processing apparatus 20, for example.

Figure 3:
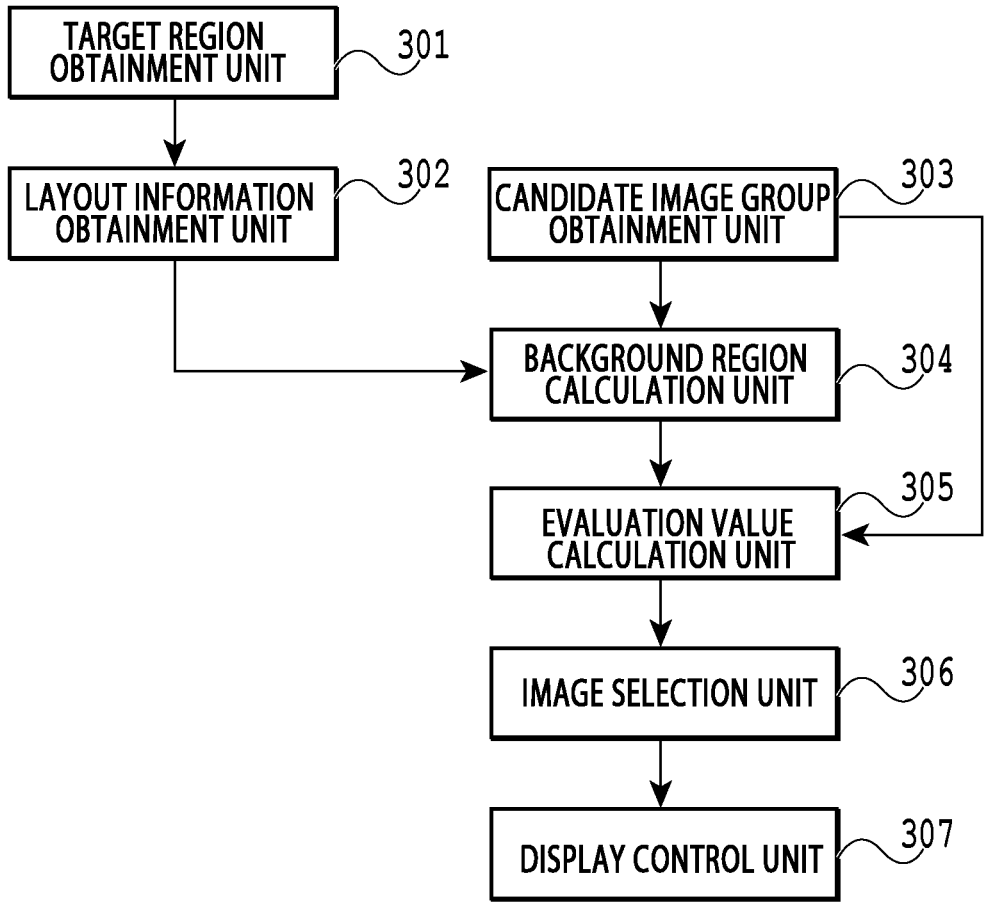
FIG. 3 is a diagram illustrating software blocks of the image processing apparatus according to the first embodiment.

FIG. 3 illustrates software blocks of the image processing apparatus according to the first embodiment. A functional configuration implemented by the document creation application installed on the image processing apparatus 20 is illustrated. The software blocks are formed of the following constituents.

A target region obtainment unit 301 obtains a region in which an image object is to be arranged, that is, a target region to be subjected to image processing, from an image region in which the image object can be arranged on the document data (hereafter, called an arrangement region). A layout information obtainment unit 302 obtains the target region obtained by the target region obtainment unit 301 and layout information on an object superimposed in the target region. A candidate image group obtainment unit 303 obtains the candidate image group to be arranged in the document data.

For each candidate image, a background region calculation unit 304 identifies an image region, that is, a background region, to be a background of a superimposed character object in a case when the candidate image obtained by the candidate image group obtainment unit 303 is arranged in the target region. Note that, although calculation processing is described in the description below as an example of processing to identify the background region, it is not limited to the calculation. An evaluation value calculation unit 305 detects the edge of the candidate image in the identified background region and identifies a value related to the edge strength based on the detected edge. Note that, although processing of calculating the edge strength evaluation value is described as an example of the processing to identify the value related to the edge strength, it is not limited to this example. An image selection unit 306 obtains a predetermined threshold as a determination criterion of image selection and selects an image object in which the visibility of the superimposed character object is not reduced from the candidate image group based on the edge strength evaluation value calculated by the evaluation value calculation unit 305 and the threshold.

A display control unit 307 controls output for displaying the image object selected by the image selection unit 306 in an image display region 402. Note that, a part of or all the functions of the constituents of the software blocks may be implemented by using a dedicated circuit. Additionally, a part of or all the functions of the constituents of the software blocks may be implemented by using a cloud computer.

(User Interface)

Figure 4:
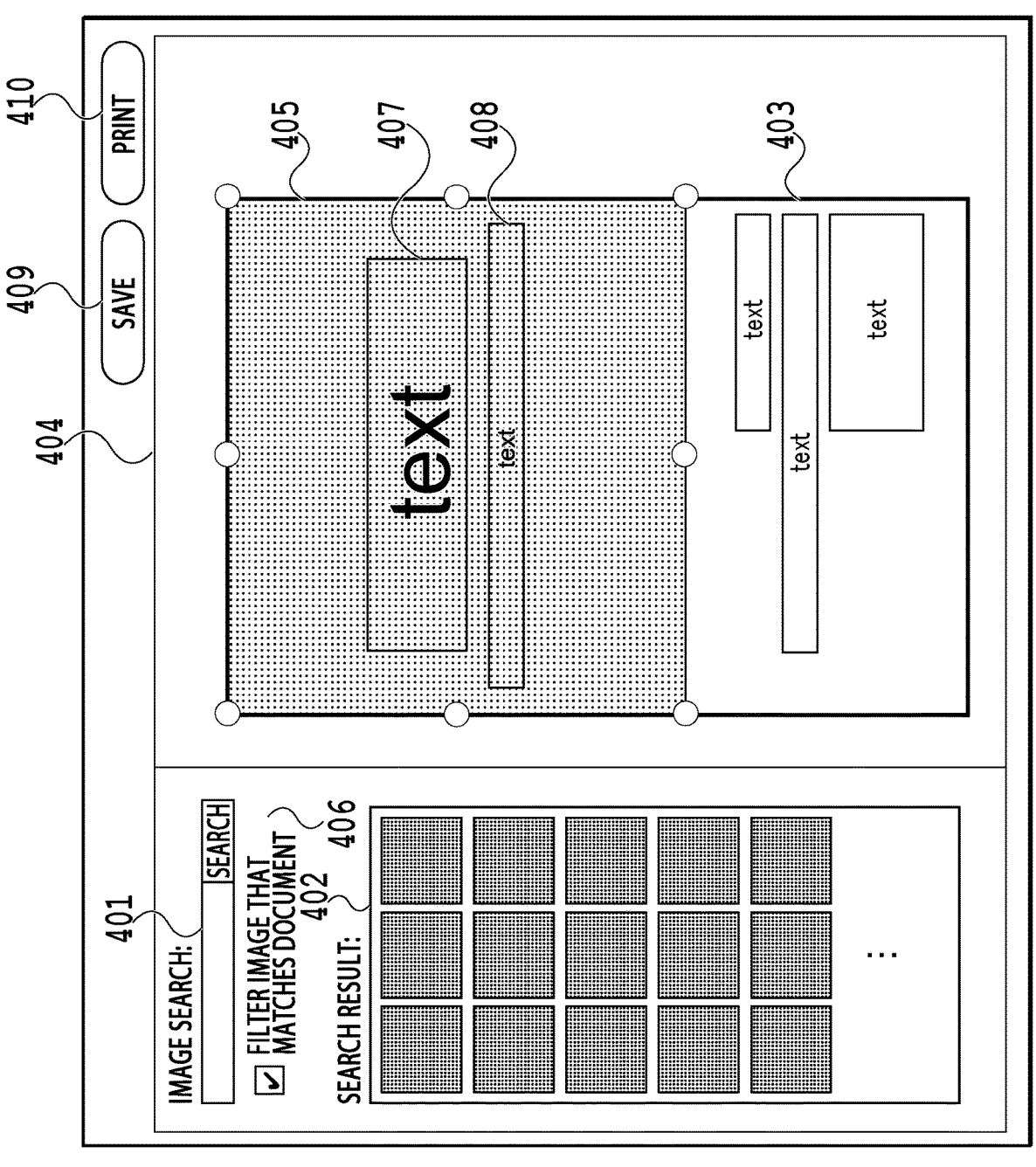
FIG. 4 is a diagram illustrating an example of a user interface of the image processing apparatus according to the first embodiment.

FIG. 4 illustrates an example of the user interface of the image processing apparatus according to the first embodiment. The UI of the image processing apparatus 20 includes an image search window 401 for image search, the image display region 402 that displays an image search result, and an edited data display region 404 that displays document data 403 in editing (displayed with a frame of thick line). The user inputs a search keyword into the image search window 401 and performs image search by using an external image provision website, and the like, cooperating with the document creation application. The user selects the image object to be inserted into the document data from the search result displayed in the image display region 402. It is possible to insert the selected image object into the arrangement region in which the image object can be arranged in the document data 403.

The UI further includes a checkbox 406 to designate an option of the image search. For example, the option may be to allow for designation, in the document data 403, of a target region 405 (displayed with hatching) into which image object is inserted from the arrangement region in which the image object can be arranged. With this option being enabled, only the image in which the visibilities of a character object 407 and a character object 408 superimposed in the target region 405 are not reduced is selected from the search result by the later-described processing, and the selected image is displayed in the image display region 402.

With a save button 409 being pressed, the edited document data 403 is saved into the HDD 204 or onto a cloud. Additionally, with a print button 410 being pressed, it is possible to establish communication with an output device connected based on set printing setting and to start printing processing. The UI illustrated in FIG. 4 is merely an example, and the UI in the present embodiment is not limited thereto.

(Processing Flow)

Figure 5:
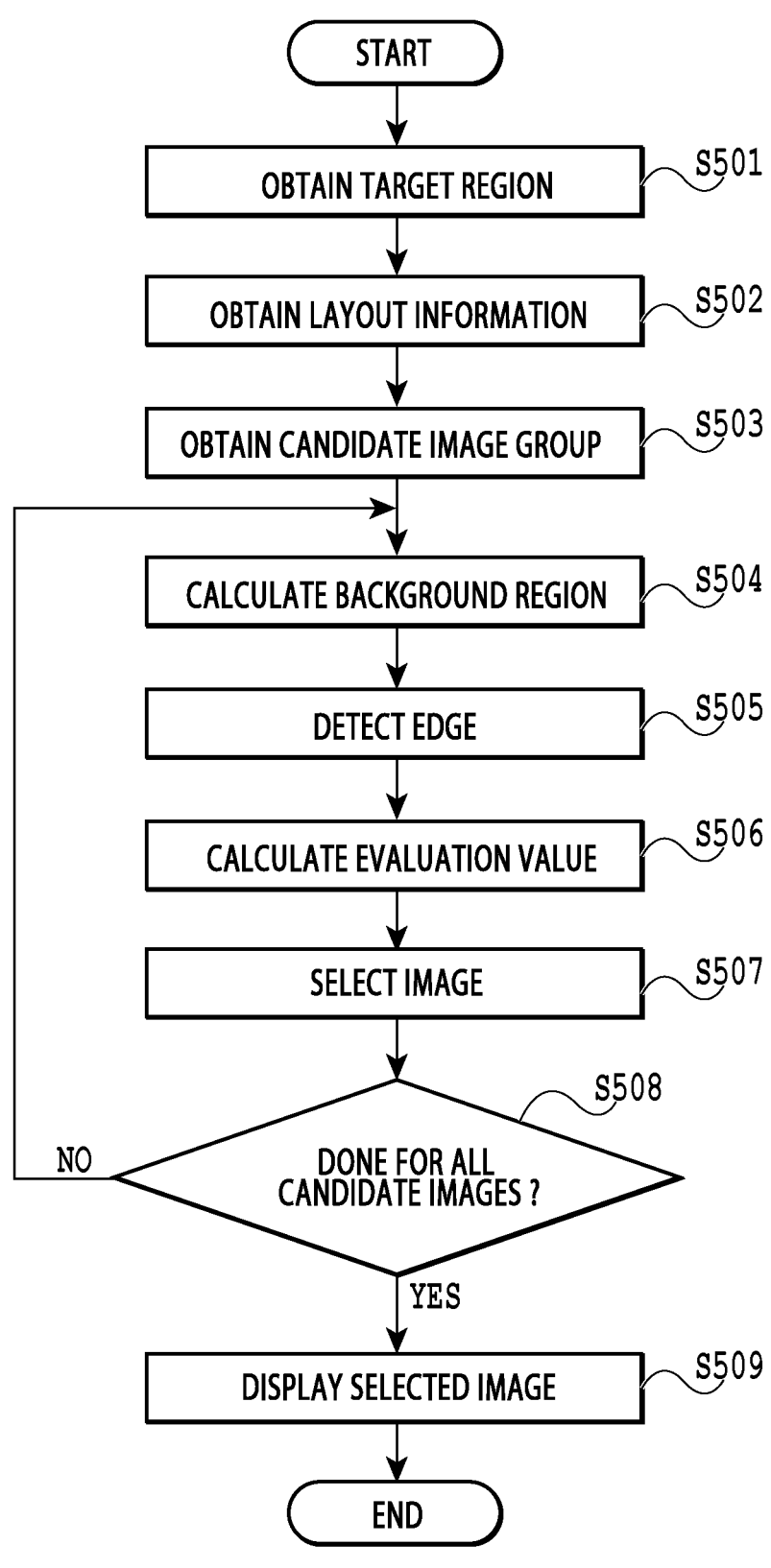
FIG. 5 is a flowchart of image processing according to the first embodiment.

FIG. 5 illustrates a flowchart of a processing procedure of the image processing executed by the image processing apparatus 20.

<Obtainment of Target Region>

In step S501, the target region obtainment unit 301 obtains the target region in which the image object is to be arranged from the arrangement region in which the image object can be arranged on the document data. The obtained target region is then outputted to the layout information obtainment unit 302. An example of the method of obtaining the target region may include a method in which the user designates the target region from the arrangement region on the document data by using the pointing device 207 on the UI. One target region may be designated, or multiple target regions may be designated to execute the later-described image processing on each of the target regions.

For example, in a case when there is only one target region 405 in the document data like the document data 403 illustrated in the UI in FIG. 4, the designation by the user may be omitted, and the target region may be one and only. As a matter of course, in a case when there is only one target region in which a text is superimposed even if the document data includes multiple target regions, the processing to designate the target region by the user may be omitted as described above. The method of obtaining the target region is not limited to the described method. As long as it is possible to obtain the target region in which the image object is to be arranged is obtained from the arrangement region in the document data, any method can be applied.

<Obtainment of Layout Information>

In step S502, the layout information obtainment unit 302 obtains the target region obtained in step S501 and the layout information on the object superimposed in the target region. The layout information on the obtained document data is then outputted to the background region calculation unit 304.

Figure 6:
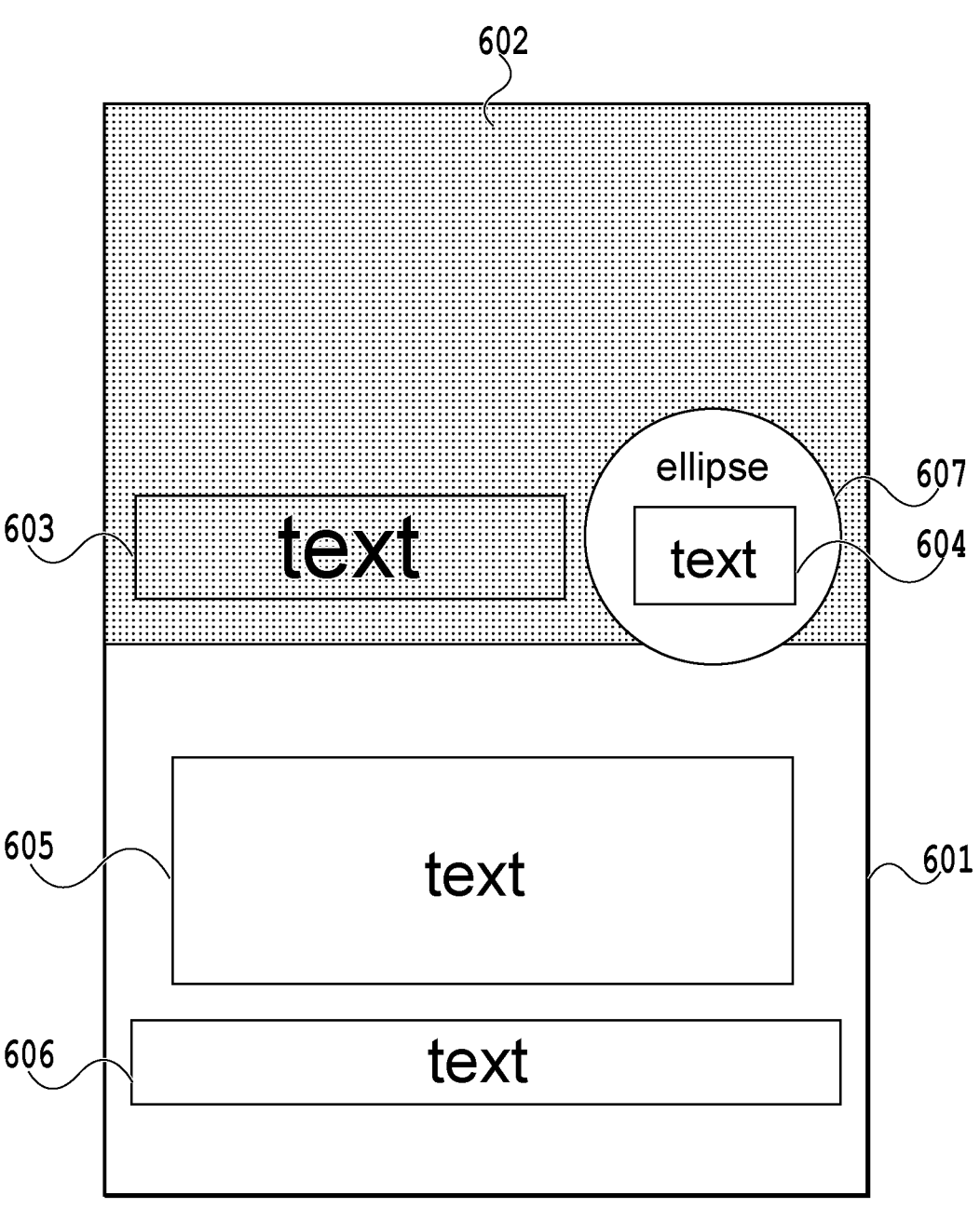
FIG. 6 is a diagram illustrating an example of document data according to the first embodiment.

FIG. 6 illustrates an example of the document data according to the first embodiment. In document data 601, the image object arranged in a target region 602 and character objects 605 and 606 are arranged. In the target region 602, character objects 603 and 604 and an ellipse object 607 are arranged, additionally. Note that, a type of the object is not limited thereto. There may be included a map object for arranging a map, a bar code object for arranging a QR code (registered trademark) and a bar code, and the like, that are not illustrated in FIG. 6.

In step S502, the layout information on the character objects 603 and 604 and the ellipse object 607 superimposed in the target region 602 in the document data 601 is obtained. The layout information is information such as a position, a size, a shape, an angle, and the order of superimposition with respect to another object that indicate the place in which each object is arranged on the document data 601. The information on the order of superimposition is, for example, information indicating that the character object 604 is arranged in front of the ellipse object 607.

Additionally, metadata required to create the document data may be obtained as the layout information. For example, in a case of the character object, attribute information such as title, subtitle, and main text may be obtained together. There may be metadata indicating a width between lines and a width between characters. As a matter of course, not only the layout information on the object superimposed in the target region but also the layout information on all the objects arranged in the document data may be obtained. The layout information may be obtained in the CSV format or may be obtained in the DB format such as SQL.

<Obtainment of Candidate Image Group>

In step S503, the candidate image group obtainment unit 303 obtains at least one or more candidate images as an input image. The candidate image group obtainment unit 303 then outputs the obtained candidate image group to the background region calculation unit 304 and the evaluation value calculation unit 305. The candidate image group is an image group of the image objects that are to be arranged while creating the document data and are candidates.

The candidate image group may be an image group obtained from an external network or server through the data communication unit 208. The method of obtaining the image group from the network or the server may include, for example, a method of obtaining from the external image provision website cooperating with the document creation application. In the UI illustrated in FIG. 4, the image search window 401 of the external image provision website cooperating with the document creation application is provided. Once the user inputs a keyword to the image search window 401 for searching, it is possible to obtain one or more image objects from the search result as the candidate image group. As a matter of course, it is unnecessary to obtain all the searched images, and only the image object that satisfies a designated condition may be obtained. Only the top N pieces of the displayed images may be obtained, or only the image object that satisfies the designated resolution may be obtained.

Additionally, an image group on a social networking service (hereafter, SNS) may be obtained. For example, a period of time in which the image is captured is designated by the user, and the image that is captured or uploaded on the SNS within the designated period of time may be obtained as the candidate image.

Moreover, it is also possible to obtain as the candidate image group an image group stored in the image processing apparatus 20 without using the data communication unit 208. For example, a not-illustrated reference button is provided on the UI. Once the user presses the reference button, a dialogue screen is displayed, and a folder set in the HDD 204 in which the image group is stored is displayed. The image group saved in the folder designated by the user can be obtained as the candidate image group. Additionally, the image group owned by an application saved in the HDD 204 can be obtained as the candidate image group. Note that, the image object obtained by the candidate image group obtainment unit 303 in the present step is not limited to the above-described image and may be another type of image.

<Calculation of Background Region>

In step S504, for each candidate image, the background region calculation unit 304 calculates the image region, that is, the background region, which is the background of the superimposed character object in a case when the candidate image obtained in step S503 is arranged in the target region obtained in step S501. The background region calculation unit 304 then outputs the calculated background region to the evaluation value calculation unit 305.

Figure 7:
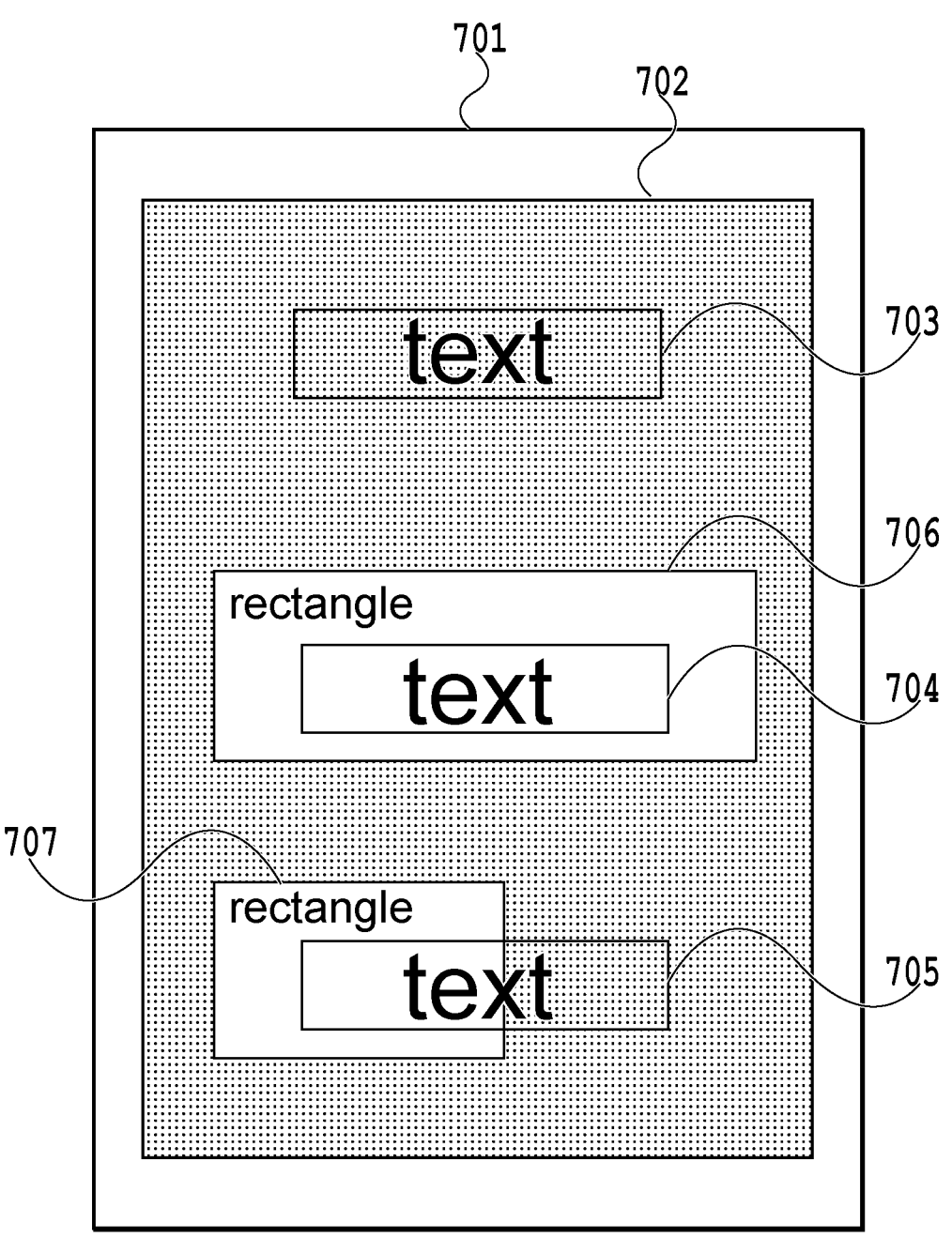
FIG. 7 is a diagram describing a method of extracting a background region.

A method of extracting the background region is described with reference to FIG. 7. The background region extracted in this case indicates a region of the character object directly superimposed on the target region. In FIG. 7, a target region 702 is designated in document data 701. In step S501, the target region 702 is obtained, and, in step S502, the layout information on character objects 703, 704, and 705 and rectangular objects 706 and 707 is obtained.

The whole character object 703 is included in the target region 702. Accordingly, the whole region in which the character object 703 is arranged is the background region in the candidate image. On the other hand, as for the character object 704, the rectangular object 706 is arranged between the target region 702 and the character object 704, and no background region of the character object 704 exists in the candidate image. Additionally, as for the character object 705, a part of the rectangular object 707 is arranged between the target region 702 and the character object 705. In this case, only a partial region in the character object 705 that is directly arranged on the target region 702 is extracted as the background region.

Figures 8A, 8B, 8C, 8D:
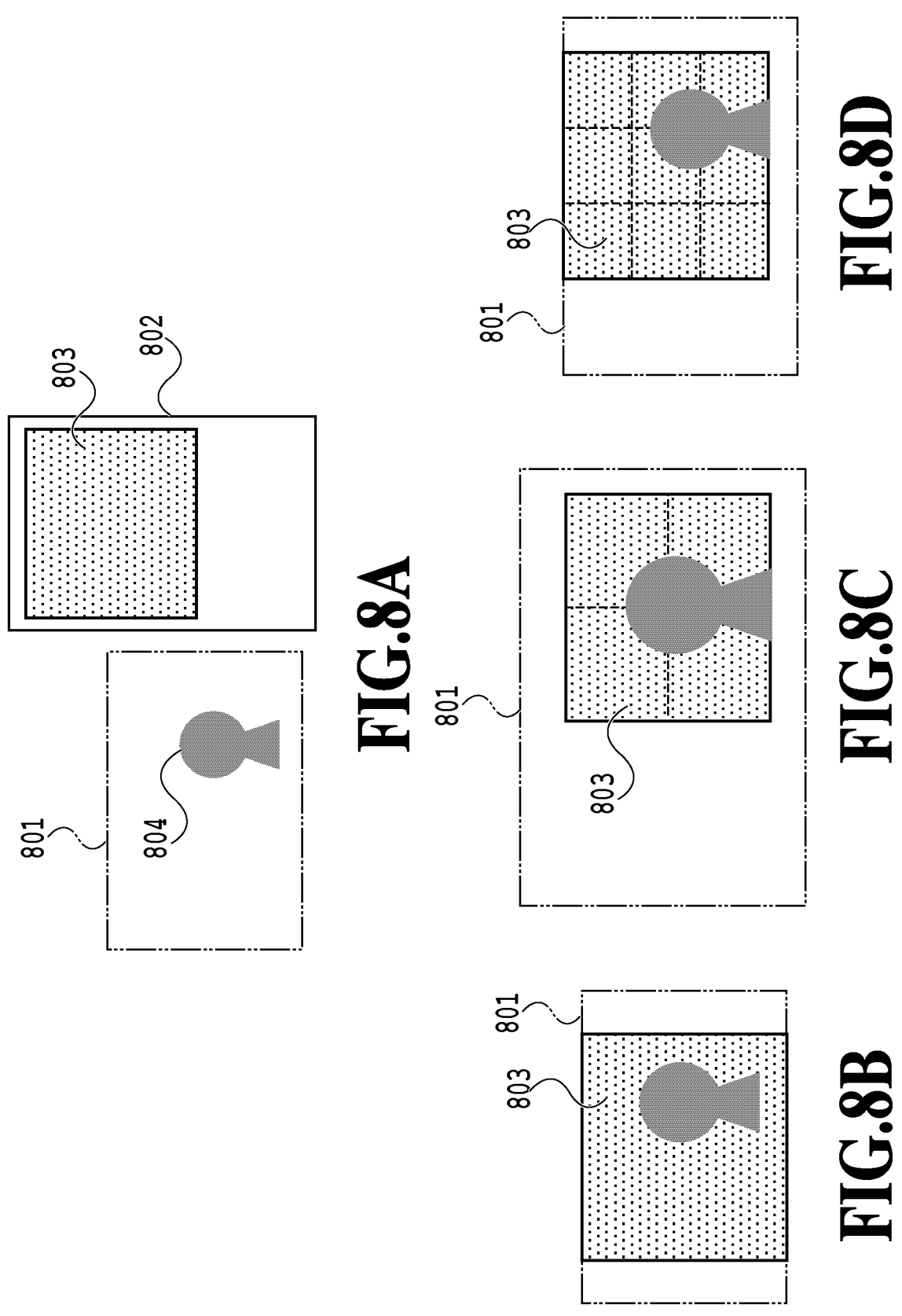
FIGS. 8A to 8D are diagrams describing a method of arranging a candidate image into a target region.

Next, a method of arranging the candidate image into the target region is described with reference to FIG. 8. A region displayed on the document data in a case when the candidate image is arranged in the target region is calculated. An example in which a candidate image 801 is arranged into the arrangement region in document data 802 illustrated in FIG. 8A is described. As illustrated in FIG. 8B, processing such as scaling processing and trimming processing may be performed such that a height of the candidate image 801 coincides with a height of a target region 803 in the document data 802. As a matter of course, processing such as scaling processing and trimming processing may be performed such that a width of the candidate image 801 coincides with a width of the target region 803 in the document data 802. Additionally, a main object of the candidate image 801 may be detected, and a detected main object 804 may be arranged so as to be positioned in the center of the target region 803 as illustrated in FIG. 8C. Moreover, the candidate image 801 may be arranged in the target region 803 according to the rule of thirds as illustrated in FIG. 8D.

As the main object detection, it is possible to use a publicly known conspicuity detection technique. For example, Grad-Cam using the deep learning technique, a trained network referred to as U2-Net, and the like may be use. Instead of the conspicuity detection technique, an object detection technique may be used to detect a specific object such as a person, an animal, and an automobile to use as the main object. As a matter of course, the detection may be implemented by a rule-based technique using no deep learning technique. The arrangement method may be used as a method that is designated in advance on a program or may be designated by the user from a not-illustrated arrangement option provided on the UI.

Figure 9:
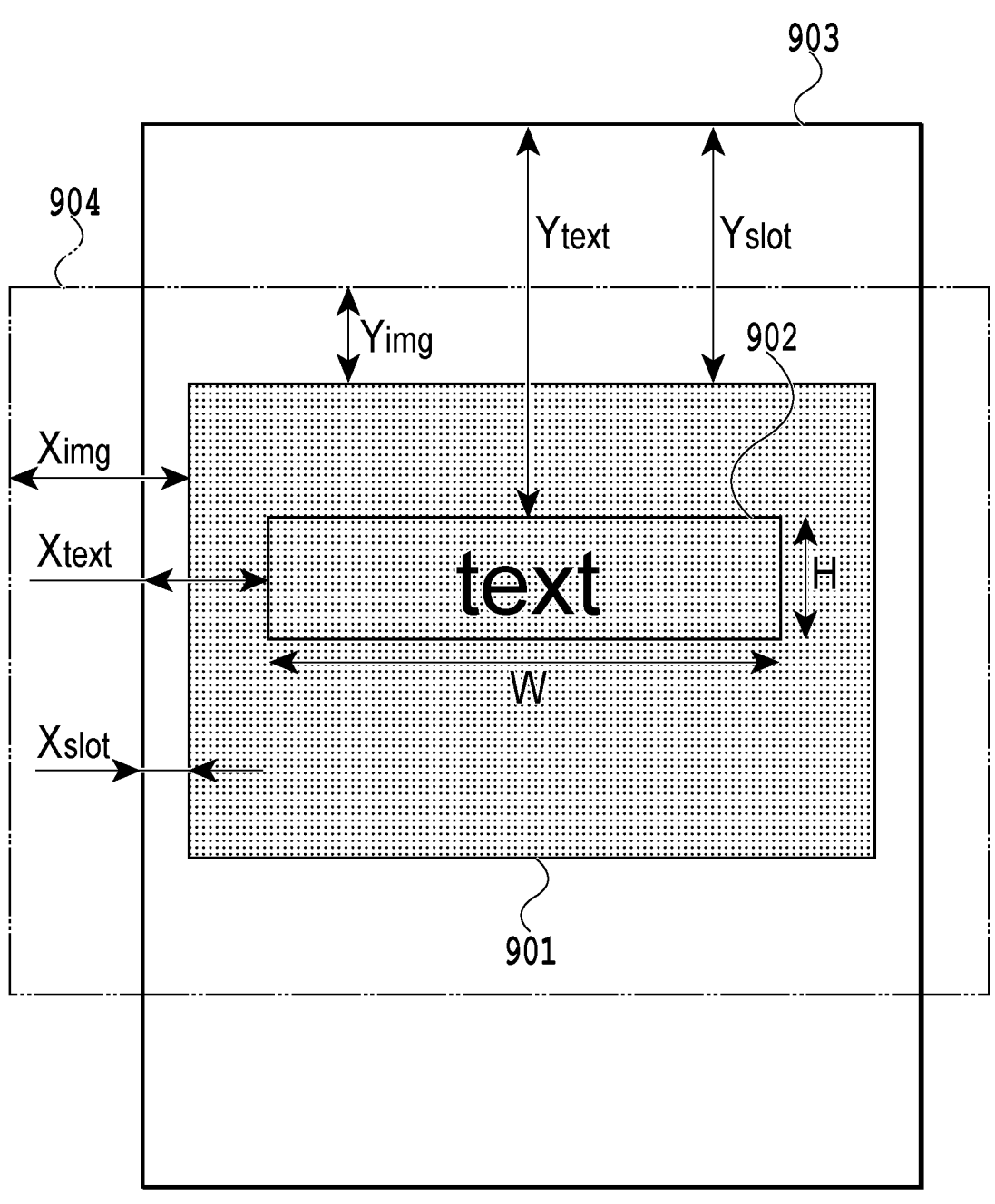
FIG. 9 is a diagram describing a method of calculating the background region.

A method of calculating the background region is described with reference to FIG. 9. The background region of the candidate image in which the character object is superimposed in the target region is calculated. Specifically, the background region in the candidate image is calculated based on the position of the candidate image displayed in the target region and the region in which the character object is superimposed in the target region. As illustrated in FIG. 9, in document data 903, a candidate image 904 is arranged in a target region 901, and a character object region 902 (width W, height H) is superimposed on the candidate image 904. The background region in the candidate image 904 can be calculated by using a coordinate with an origin in the upper left of the candidate image 904, in which $(Ximg-Xslot+Xtext, Yimg+Yslot-Ytext)$ is a starting point, and a rectangular region of the width W and the height H is formed from this starting point. In this case, Ximg and Yimg indicate positional information of the arrangement of the candidate image 904, Xslot and Yslot indicate positional information on the target region 901, and Xtext and Ytext indicate positional information on the character object.

Although an example in which the whole character object region 902 is included within the target region 901 is described herein, it is possible to similarly calculate the background region based on the layout information on each object also in a different case. Additionally, the background region may be calculated by using an image processing method such as obtaining a document data image that is a rendered text and a document data image obtained by not displaying or by deleting the text and then rendering, and using a difference image therefrom. The calculation method is not limited thereto as long as it is possible to calculate the background region in which the character object is super-imposed in the candidate image.

<Detection of Edge>

In step S505, the evaluation value calculation unit 305 obtains the background region calculated in step S504, and the edge of the background region in the candidate image is detected. As an edge detection unit, it is possible to use a common edge detection filter such as the Sobel filter, the Prewitt filter, and the like. In a case when the inputted image is an RGB image, the edge may be detected after converting the image into a luminance image. For example, after the conversion from RGB into YCbCr by using Equation (1) to Equation (3), it is possible to use the luminance image (Y channel). The conversion equations from RGB into YCbCr are merely examples, and another conversion equation may be used.

$$Y=0.299R+0.587G+0.114B \qquad \text{Equation (1)}$$

$$Cb=-0.169R-0.331G+0.5B \qquad \text{Equation (2)}$$

$$Cr=0.5R-0.419G-0.081B \qquad \text{Equation (3)}$$

As a matter of course, the edge may be detected after the conversion into not the luminance image but into a gray image, or the edge may be detected for each of an R image, a G image, and a B image.

The edge may be detected by applying a high-pass filter or a bandpass filter that extracts only a high frequency signal on a frequency space obtained by the Fourier transformation of the image and thereafter performing the inverse Fourier transformation. A filter size in the edge detection and a bandwidth on the frequency space may be designed arbitrarily. For example, it is possible to design the filter size and a bandwidth of the high-pass filter or the bandpass filter such that the edge of a highly sensitive frequency band can be detected by using an approximate equation of Dooley described below.

$$VTF=5.05\times exp(-0.138\times\pi lf/180)\times(1-exp(-0.1\times\pi lf/180)) \qquad \text{Equation (4)}$$

Here, l is an observation distance [mm], and f is a frequency [cycle/mm]. With the edge having a highly sensitive visual frequency characteristic being detected, it is possible to calculate the evaluation value having higher affinity with the visibility in the later-described evaluation value calculation step. As a matter of course, the method is not limited thereto as long as it is possible to detect the edge of the background region.

Additionally, the edge detection may be performed on only the background region in the candidate image, or the edge detection may be performed on the whole region of the candidate image, and only the edge of the background region may be used in the calculating of the edge strength evaluation value in the later-described step S506.

Method of Calculating Edge Strength

<Calculation of Evaluation Value>

In step S506, the evaluation value calculation unit 305 calculates the edge strength evaluation value based on the edge detection result of the candidate image calculated in step S505. The evaluation value calculation unit 305 then outputs the calculated edge strength evaluation value to the image selection unit 306.

In the method of calculating the edge strength evaluation value, for example, it is possible to use a representative value of the edge strength detected in step S505. As the representative value, for example, it is possible to use a statistical value such as average value, maximum value, minimum value, mode value, and median value. A density in the background region of the detected edge may be calculated and used. Additionally, in a case when the edge is detected in the frequency space in step S505, a power spectrum of the detected bandwidth may be used as the edge strength evaluation value. The calculation method is not limited thereto as long as the edge strength evaluation value is calculated based on the detected edge.

<Selection of Image>

In step S507, the image selection unit 306 selects the image object based on the edge strength evaluation value calculated in step S506 and a predetermined threshold set in advance. Specifically, whether the edge strength evaluation value is less than a threshold is determined, and only the candidate image with the edge strength evaluation value less than the threshold is outputted to the display control unit 307 as a selected image. Thus, it is possible to select the image object in which the visibility of the superimposed character object is not reduced in a case of the arrangement into the document data.

As the threshold as a criterion for the image selection, a value that is less than the edge strength evaluation value of the character object is set in advance. For example, an already-existing document data group created in advance by a professional such as a designer, or the like, may be analyzed, and the threshold may be set so as to be equal to or less than the average value or the mode value of the evaluation value described in step S506. As a matter of course, in the document data designed by the professional, an image in which the edge strength of the character object is greater than the edge strength of the superimposed image is usually selected taking into consideration the visibility. For this reason, it is considered that the document data designed by the professional is appropriate to be used as the threshold for the case in which the user arranges the image.

Additionally, multiple thresholds may be held to be switched and used depending on the size of the character object as the target. For example, in the Web Content Accessibility Guidelines 2.0 (WCAG2.0), which is a guide-line for web contents, the criteria for the visibility of the character object are differentiated based on whether it is 18 pt or greater, and a stricter criterion is provided for a case of smaller than 18 pt. In the present step, the threshold may also be switched depending on whether the superimposed char-acter object is 18 pt or greater, and if it is smaller than 18 pt, a smaller threshold may be applied.

As a matter of course, the threshold may be switched and used according to a uniquely set criterion of the character object size. It is possible to select the image in which the visibility of the superimposed character object is not reduced regardless of the size of the character object. Additionally, the threshold may be switched in accordance with not the size of the character object but with an attribute of the character object. For example, it is possible to secure more sufficient visibility for the character object to which an attribute of title or subtitle is applied by setting a smaller threshold than that of another character object.

Note that the method of setting the threshold is not limited to the above-described method, and any method is applicable as long as a value smaller than the edge strength of the character object is set as the threshold.

In a case when multiple character objects are arranged on one image region in the target document, determination on each of the multiple character objects is performed in a case of selecting the image. Then, only the candidate image in which the evaluation value with respect to all the character objects is less than the threshold may be the selected image. In a case when the attribute is applied to the character object, only the character object with the specific attribute such as title and subtitle may be the determination target. A threshold may be set to the size of the character object, and only the character object of a size equal to or greater than the threshold may be the determination target.

In step S508, the image selection unit 306 determines whether the selecting from all the images in the candidate image group obtained in step S503 is performed. If the selecting from all the candidate images ends, the process proceeds to step S509. On the other hand, if the selecting from all the candidate images does not end, the processing from step S504 is performed on the next candidate image.

<Displaying of Selected Image>

In step S509, the display control unit 307 performs control to display the selected image selected in step S507 onto the UI. For example, the display control unit 307 displays the selected image in the image display region 402 as the UI example illustrated in FIG. 4. In a case when the image search result from the external image provision website and the like cooperating with the document creation application or an image included in the document creation application is already displayed in the image display region 402 in the UI, the selected image is displayed as below. That is, if the checkbox 406 of the image search option is enabled, the display control unit 307 may overwrite the selected image selected in step S507 into the image display region 402. Instead of the displaying by overwriting into the image display region 402, a not-illustrated selected image display region different from the image display region 402 may be provided, and the candidate image group and the selected image may be displayed next to each other.

Additionally, as the display order of the selected image, the selected image may be displayed in the order of performing the image selection processing, or the evaluation value in the image selection may be stored, and the selected image may be displayed in the ascending order of the evaluation value. As a matter of course, the selected image may not be displayed on the UI and merely saved in the HDD 204 or the like.

Effect of First Embodiment

The image processing apparatus according to the first embodiment selects from the candidate image group only the image with the small evaluation value based on the edge strength of the background region that is the background of the superimposed character object in a case of the arrangement into the document data and displays the selected image in the display region. That is, the user can select the image in which the visibility of the superimposed character object is not reduced without arranging all the candidate images in the document data for confirmation, and therefore the work efficiency in the document data creation is improved.

Second Embodiment

A second embodiment is image processing in a case when an object (hereinafter, referred to as a transparent object) to which transparency is set is arranged between the target region and the character object in the document data. The image processing apparatus detects the edge of a rendering image in which the object to which the transparency is set is superimposed on the candidate image. Then, the image is selected based on the evaluation value calculated from the rendering image.

A configuration of the image processing apparatus according to the second embodiment is the same as the configuration illustrated in FIG. 2 in the first embodiment; for this reason, the description is omitted.

(Software Blocks)

Figure 10:
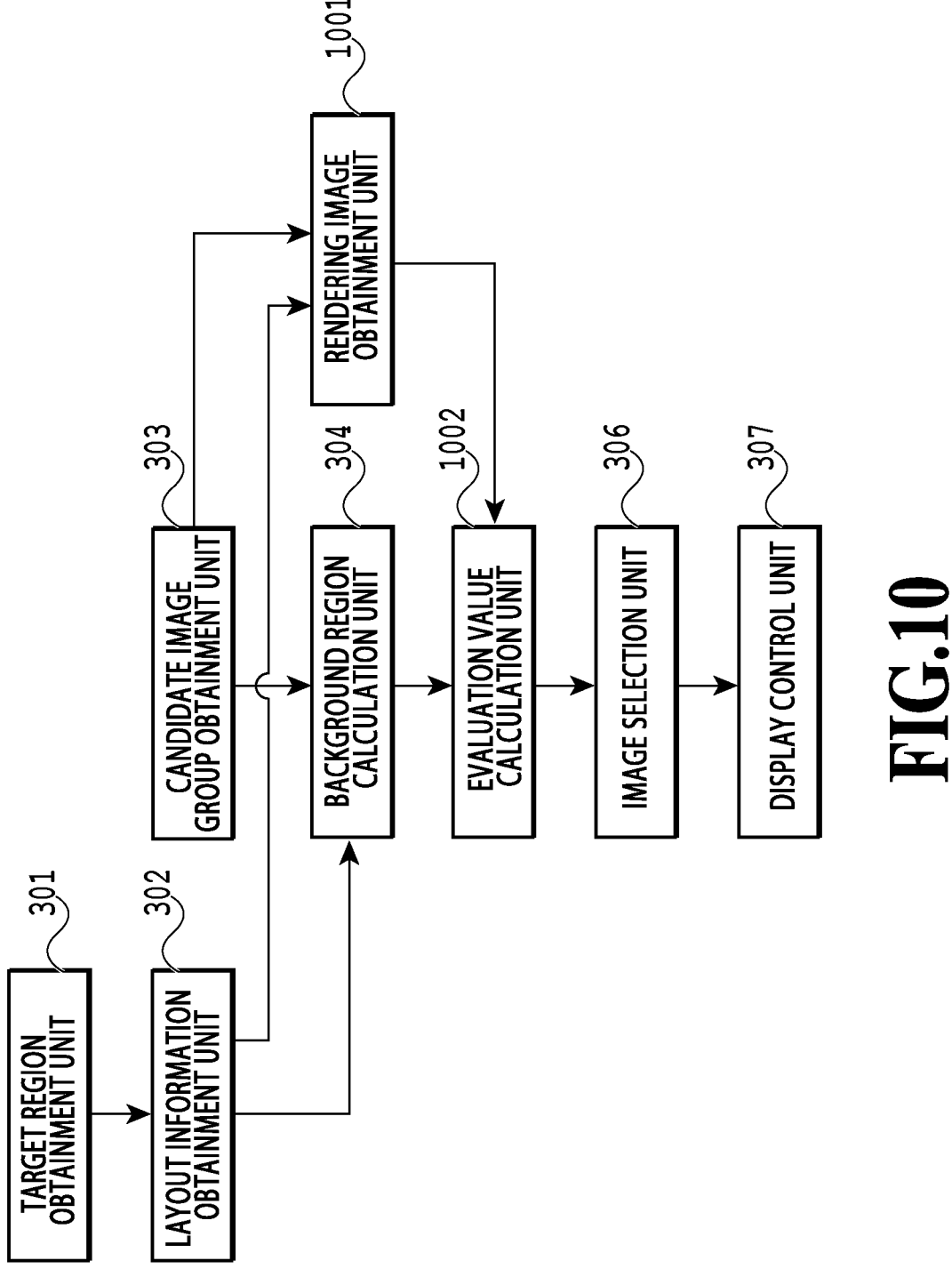
FIG. 10 is a diagram illustrating software blocks of an image processing apparatus according to a second embodiment of the present disclosure.

FIG. 10 illustrates software blocks of the image processing apparatus according to the second embodiment of the present disclosure. The target region obtainment unit 301, the layout information obtainment unit 302, the candidate image group obtainment unit 303, the background region calculation unit 304, the image selection unit 306, and the display control unit 307 have the same functions as the functions in the first embodiment; for this reason, the descriptions are omitted. Only the different parts from the functions illustrated in FIG. 3 are described.

In a case when the transparent object to which the transparency is set is arranged between the target region and the character object in the document data, a rendering image obtainment unit 1001 obtains a rendering image obtained by rendering the transparent object on the candidate image. An evaluation value calculation unit 1002 detects the edge of the background region of the rendering image obtained by the rendering image obtainment unit 1001 and calculates the detected edge strength evaluation value.

(Processing Flow)

Figure 11:
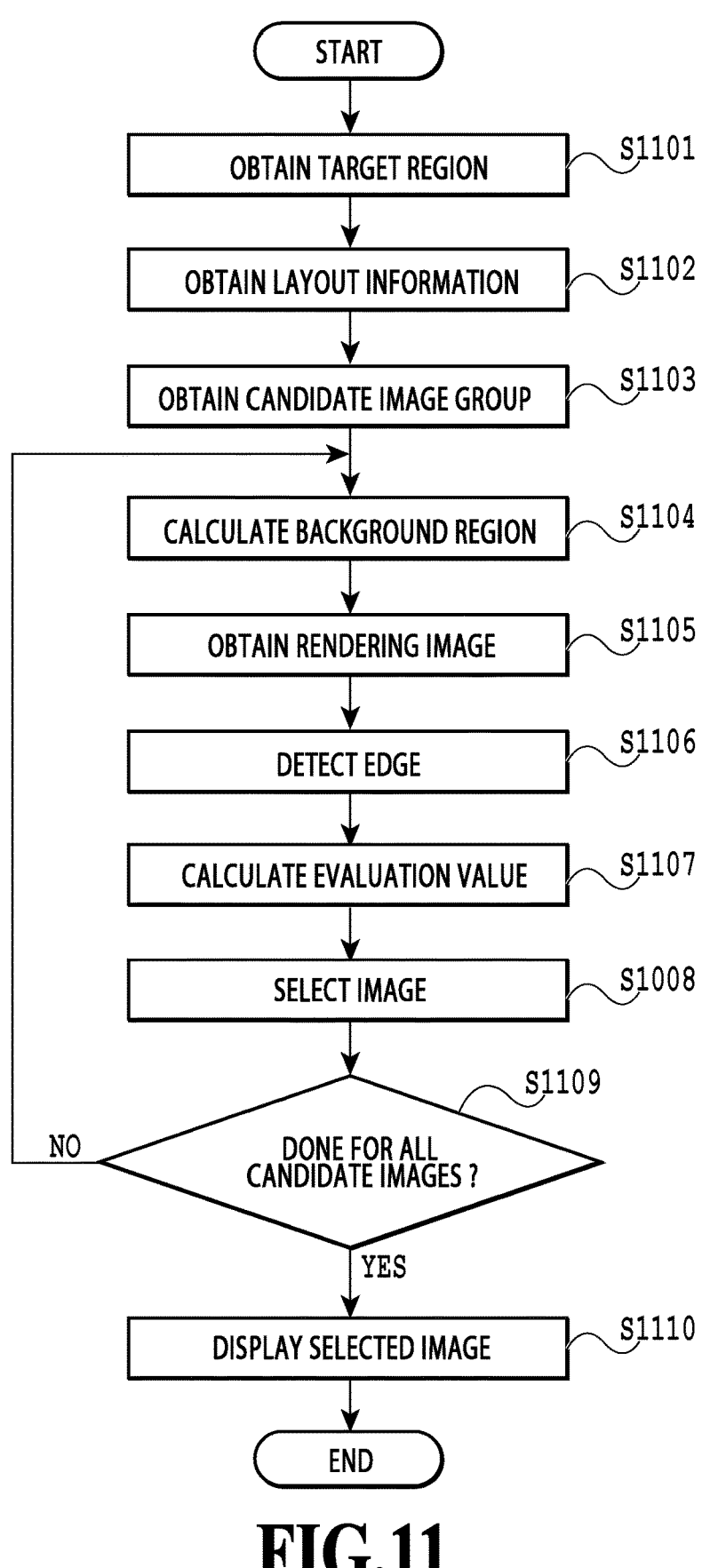
FIG. 11 is a flowchart of image processing according to the second embodiment.

FIG. 11 illustrates a flowchart of the image processing according to the second embodiment. Steps S1101 to S1103 and steps S1107 to S1110 are the same as the processing of steps S501 to S503 and steps S506 to S509 illustrated in FIG. 5 in the first embodiment. For this reason, the descriptions are omitted. Only the different parts from the flowchart in FIG. 5 are described.

<Calculation of Background Region>

In step S1104, for each candidate image, the background region calculation unit 304 calculates the image region, that is, the background region, which is the background of the superimposed character object in a case when the candidate image obtained in step S1103 is arranged in the target region obtained in step S1101. The background region calculation unit 304 then outputs the calculated background region to the evaluation value calculation unit 1002. In the second embodiment, a region including the transparent object is also calculated as the background region.

Figures 12A, 12B, 12C:
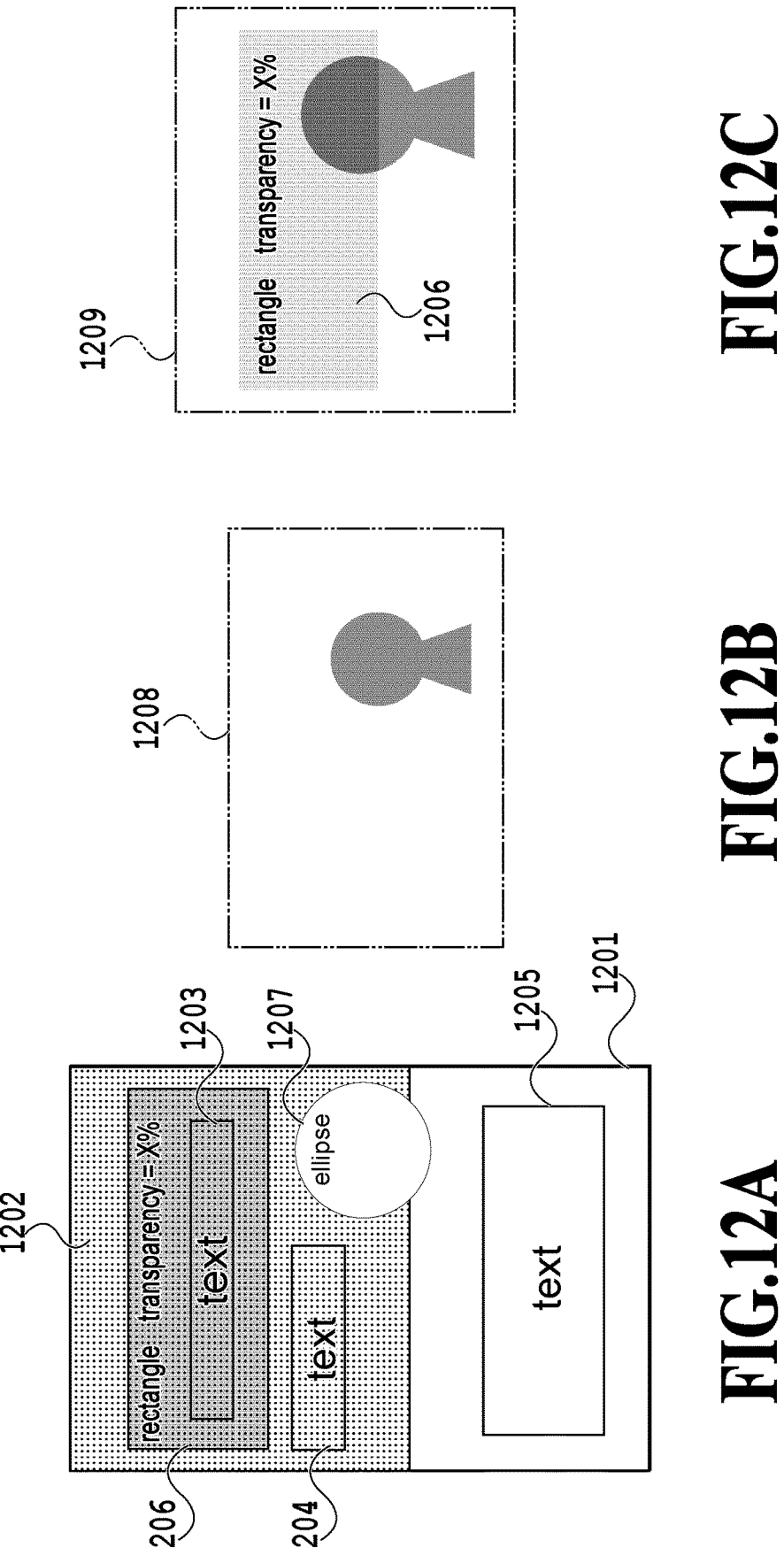
FIGS. 12A to 12C are diagrams illustrating an example of document data and an example of a rendering image according to the second embodiment.

FIGS. 12A to 12C illustrate an example of the document data and an example of the rendering image according to the second embodiment. In document data 1201 illustrated in FIG. 12A, the image object arranged in a target region 1202 and a character object 1205 are arranged. Additionally, character objects 1203 and 1204 and an ellipse object 1207 are arranged in the target region 1202. In this case, the transparency is set to a rectangular object 1206 arranged between the character object 1203 and the target region 1202. Since the whole character objects 1203 and 1204 are included in the target region 1202, the whole region in which the character objects are arranged is obtained as the background region in the candidate image. The arrangement of the candidate image into the image region and the specific method of calculating the background region are the same as the processing described in step S504 in FIG. 5.

<Obtainment of Rendering Image>

In step S1105, the rendering image obtainment unit 1001 obtains the rendering image obtained by rendering the transparent object on the candidate image arranged in the target region based on the layout information obtained by the layout information obtainment unit 302. The rendering image obtainment unit 1001 then outputs the obtained rendering image to the evaluation value calculation unit 1002.

In this case, rendering indicates processing to convert the document data described in a markup language into the image data. For example, in a case when the document data is drawn in a format such as Hyper Text Markup Language (HTML) or Scalable Vector Graphics (SVG), it is possible to obtain a state what the user is seeing as the image data by performing the rendering processing. As the method of the rendering processing, it is possible to use a publicly known library and the like.

FIG. 12B illustrates a candidate image 1208. FIG. 12C illustrates the rendering image obtained in a case when a candidate image 1208 is arranged such that a height of the candidate image 1208 coincides with a height of the target region 1202. A rendering image 1209 is an image obtained by superimposing the transparent object 1206 on the candidate image 1208 arranged in the target region 1202. For example, after the candidate image 1208 is arrange in the document data 1201, an object other than the transparent object 1206 is deleted on HTML or SVG in which the document data 1201 is drawn, and the rendering processing is performed. Alternatively, it is possible to obtain the rendering image by performing the rendering processing by not displaying (transparency 100%) the object other than the transparent object 1206. The method of obtaining the rendering image is not limited to the methods. Any method may be applicable as long as it is possible to obtain the rendering image in which the transparent object is superimposed on the candidate image.

<Detection of Edge>

In step S1106, the evaluation value calculation unit 1002 obtains the background region calculated in step S1104 and detects the edge of the background region in the rendering image. The method of detecting the edge is the same as the processing described in step S505 in FIG. 5.

Effect of Second Embodiment

The image processing apparatus according to the second embodiment detects the edge of the image obtained by rendering the transparent object instead of evaluating only the candidate image, in a case when the transparent object is arranged between the target region and the character object. Since the evaluation value is calculated based on a result therefrom, it is possible to correctly evaluate the visibility in a case when the document data is actually displayed.

Third Embodiment

The image processing apparatus according to a third embodiment obtains for each candidate image the rendering image rendered with the superimposed character object in a case when the candidate image is arranged in the document data. Then, the candidate image is selected by comparing the edge strength evaluation value calculated from the candidate image not with a predetermined threshold determined in advance but with the edge strength evaluation value calculated from the rendering image.

A configuration of the image processing apparatus according to the third embodiment is the same as the configuration illustrated in FIG. 2 in the first embodiment. For this reason, the description is omitted.

(Software Blocks)

A configuration of software blocks of the image processing apparatus 20 according to the third embodiment is similar to the configuration illustrated in FIG. 10 in the second embodiment. However, the functions of the rendering image obtainment unit 1001, the evaluation value calculation unit 1002, and the image selection unit 306 are different from the functions in the second embodiment. For this reason, the functions are described below. Other parts of the software blocks have the same functions as that of the second embodiment; for this reason, the descriptions are omitted.

The rendering image obtainment unit 1001 obtains the rendering image obtained by rendering the superimposed character object on the candidate image in the document data. The evaluation value calculation unit 1002 detects the edges of the candidate image and the rendering image based on the calculated background region and calculates the edge strength evaluation values based on the detected corresponding edges. The image selection unit 306 selects the image in which the visibility of the character object is not reduced from the candidate image group based on the edge strength evaluation value calculated from the candidate image and the edge strength evaluation value calculated from the rendering image.

(Processing Flow)

Figure 13:
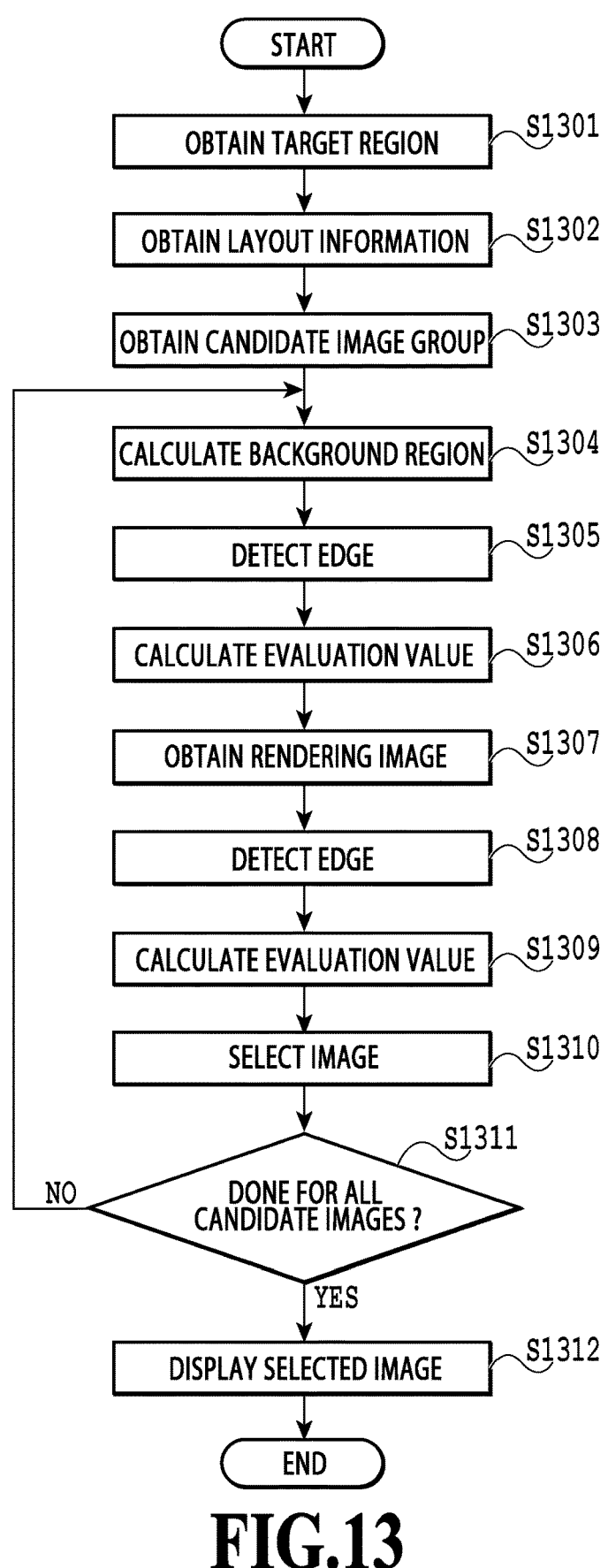
FIG. 13 is a flowchart illustrating image processing according to a third embodiment of the present disclosure.

FIG. 13 illustrates a flowchart of the image processing according to the third embodiment of the present disclosure. Step S1301 to S1306, S1311, and S1312 are the same as the processing of steps S501 to S506, S508, and S509 illustrated in FIG. 5 in the first embodiment. For this reason, the descriptions are omitted. Only the different parts from the flowchart in FIG. 5 are described.

<Obtainment of Rendering Image>

In step S1307, the rendering image obtainment unit 1001 obtains the rendering image obtained by rendering the character object on the candidate image arranged in the target region based on the layout information obtained by the layout information obtainment unit 302. The rendering image obtainment unit 1001 then outputs the obtained rendering image to the evaluation value calculation unit 1002. The method of obtaining the rendering image is similar to the processing of S1105 illustrated in FIG. 11 in the second embodiment. In this process, if the character object is decorated, the decoration is also rendered. The decoration may include, for example, outline character, shadow, glow, and so on. As a matter of course, the decoration of the character object is not limited thereto.

<Detection of Edge>

In step S1308, the evaluation value calculation unit 1002 obtains the background region calculated in step S1304 and detects the edge of the background region in the rendering image. The method of detecting the edge is the same as the processing described in step S505 in FIG. 5.

<Calculation of Evaluation Value>

In step S1309, the evaluation value calculation unit 1002 calculates the edge strength evaluation value based on the edge of the background region in the rendering image that is calculated in step S1308. The evaluation value calculation unit 1002 then outputs the calculated edge strength evaluation value to the image selection unit 306. The method of calculating the edge strength evaluation value is the same as the processing described in step S506 in FIG. 5. Additionally, in addition to the calculation method described in step S506, the evaluation value may be calculated by extracting only a partial region including the edge of the character object from the rendering image and using only the edge strength of the extracted partial region.

<Selection of Image>

In step S1310, the image selection unit 306 obtains the edge strength evaluation value (hereafter, referred to as a first evaluation value) calculated from the candidate image in step S1306. Additionally, the image selection unit 306 obtains the edge strength evaluation value (hereafter, referred to as a second evaluation value) calculated from the rendering image in step S1309. Whether the first evaluation value is less than the second evaluation value is determined, and only the candidate image in which the first evaluation value is less than the second evaluation value is outputted to the display control unit 307 as the selected image. Thus, it is possible to select the image in which the visibility of the superimposed character object is not reduced in a case of the arrangement into the document data.

Effect of Third Embodiment

The image processing apparatus according to the third embodiment obtains and evaluates the rendering image in a case of the arrangement into the document data for each candidate image. Therefore, it is possible to calculate the evaluation value taking into consideration the character object size, the effect, and the like, of the document data as the target. Accordingly, it is possible to perform further accurate evaluation on the visibility of the character object superimposed in the document data.

Fourth Embodiment

In a case when the image arranged in the document data as a criterion (hereafter, referred to as a criterion image) is replaced with the image in the candidate image group, the image processing apparatus according to a fourth embodiment selects the candidate image by comparing the edge strength evaluation value calculated from the criterion image with that of the candidate image.

A configuration of the image processing apparatus according to the fourth embodiment is the same as the configuration illustrated in FIG. 2 in the first embodiment. For this reason, the description is omitted.

(Software Blocks)

Figure 14:
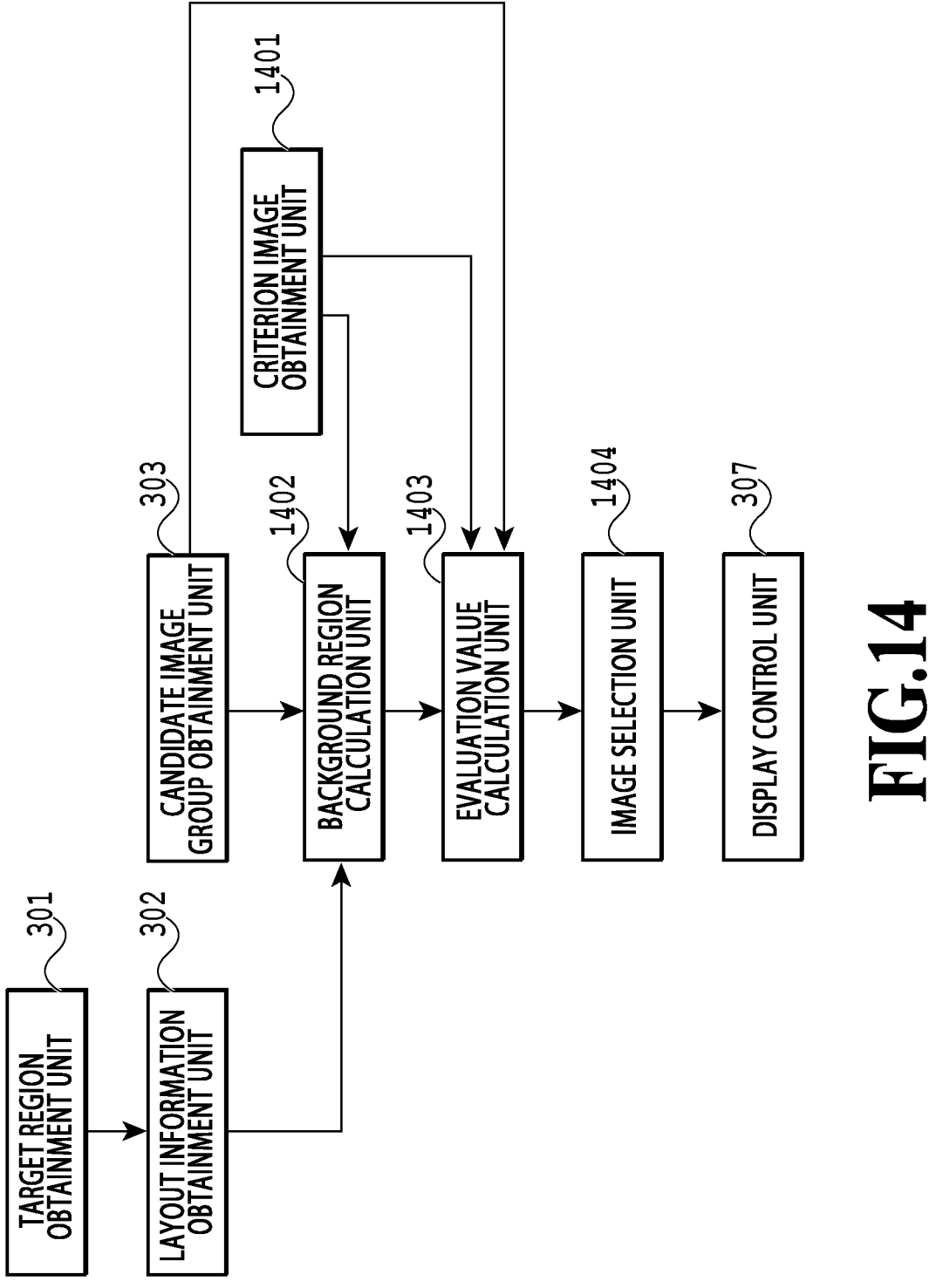
FIG. 14 is a diagram illustrating software blocks of an image processing apparatus according to a fourth embodiment of the present disclosure.

FIG. 14 illustrates software blocks of the image processing apparatus according to the fourth embodiment of the present disclosure. The target region obtainment unit 301, the layout information obtainment unit 302, the candidate image group obtainment unit 303, and the display control unit 307 have the functions same as the functions in the first embodiment. For this reason, the descriptions are omitted. Only the different parts from the functions illustrated in FIG. 3 are described.

A criterion image obtainment unit 1401 obtains the criterion image arranged in the document data as the criterion. A background region calculation unit 1402 calculates, for each candidate image, the background region of the superimposed character object in a case when the candidate image obtained by the candidate image group obtainment unit 303 is arranged in the target region. In addition, the background region calculation unit 1402 calculates the background region of the superimposed character object in a case when the criterion image obtained by the criterion image obtainment unit 1401 is arranged in the target region. An evaluation value calculation unit 1403 detects the edges of the criterion image and the candidate image based on the calculated background region, and calculates the edge strength evaluation value based on the detected corresponding edges. An image selection unit 1404 selects the image in which the visibility of the character object is not reduced from the candidate image group based on the edge strength evaluation value calculated from the criterion image and the edge strength evaluation value calculated from the candidate image.

(Processing Flow)

Figure 15:
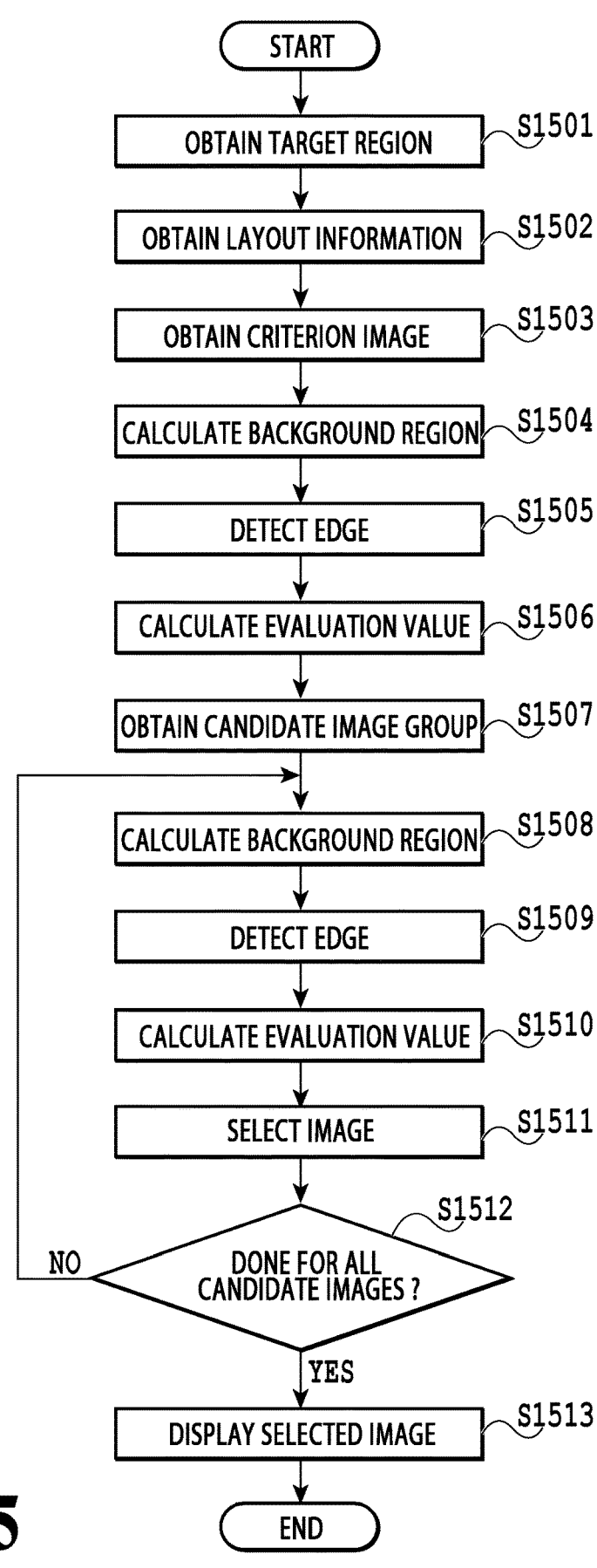
FIG. 15 is a flowchart of image processing according to the fourth embodiment.

FIG. 15 illustrates a flowchart of the image processing according to the fourth embodiment. Steps S1501, S1502, S1507 to S1510, S1512, and S1513 are the same as the processing of steps S501, S502, S503 to S506, S508, and S509 illustrated in FIG. 5 in the first embodiment. For this reason, the descriptions are omitted. Only the different parts from the flowchart in FIG. 5 are described below.

<Obtainment of Criterion Image>

In step S1503, the criterion image obtainment unit 1401 obtains the image arranged in the document data as the criterion (hereafter, referred to as the criterion image). The criterion image obtainment unit 1401 then outputs the obtained criterion image to the background region calculation unit 304 and the evaluation value calculation unit 1403.

The document data as the criterion may include, for example, the document data created by the designer. It can be considered that, in the document data, the size, the effect, and the like, of the character object used are taken into consideration, and the image in which the visibility of the character object is not lost is selected by the designer. The criterion image is appropriate to be the criterion for arranging the image selected by the user on the document data.

<Calculation of Background Region>

In step S1504, the background region calculation unit 304 calculates the background region of the superimposed character object in a case when the criterion image obtained in step S1503 is arranged in the target region obtained in step S1501. The background region calculation unit 304 then outputs the calculated background region to the evaluation value calculation unit 1403. The specific method of calculating the background region is the same as the processing described in step S504 in FIG. 5.

<Detection of Edge>

In step S1505, the evaluation value calculation unit 1403 obtains the background region of the criterion image calculated in step S1504 and detects the edge of the background region in the criterion image. The method of detecting the edge is the same as the processing described in step S505 in FIG. 5.

<Calculation of Evaluation Value>

In step S1506, the evaluation value calculation unit 1403 calculates the edge strength evaluation value based on the edge of the background region in the criterion image that is calculated in step S1505. The evaluation value calculation unit 1403 then outputs the calculated edge strength evaluation value to the image selection unit 1404. The method of calculating the edge strength evaluation value is the same as the processing described in step S506 in FIG. 5.

<Selection of Image>

In step S1511, the image selection unit 1404 obtains the edge strength evaluation value calculated from the criterion image in step S1506 (hereafter, referred to as a criterion evaluation value) and the edge strength evaluation value calculated from the candidate image in step S1510 (hereafter, referred to as an evaluation value). Whether the evaluation value is less than the criterion evaluation value is determined, and only the candidate image in which the evaluation value is less than the criterion evaluation value is outputted to the display control unit 307 as the selected image. Thus, it is possible to select the image in which the visibility of the superimposed character object is not reduced in a case of the arrangement into the document data.

Effect of Fourth Embodiment

The image processing apparatus according to the fourth embodiment selects the candidate image based on the criterion value calculated from the criterion image arranged in the document data as the criterion. Thus, it is possible to perform the evaluation taking into consideration the character object size, the effect, and the like, of the document data as the target. Additionally, since it is unnecessary to obtain the image obtained by rendering the character object for each candidate image, it is possible to implement faster image processing than the method described in the third embodiment.

Fifth Embodiment

The image processing apparatus according to a fifth embodiment obtains a reduced image of the candidate image group and calculates the evaluation value based on the edge strength of each reduced image. The image in which the calculated evaluation value is less than a predetermined threshold is filtered, and the visibility of the superimposed character object on the document data of only the filtered image is evaluated.

A configuration of the image processing apparatus according to the fifth embodiment is the same as the configuration illustrated in FIG. 2 in the first embodiment. For this reason, the description is omitted. The functions of the software blocks are also the same as the functions illustrated in FIG. 3 in the first embodiment. For this reason, the descriptions are omitted.

In a case when there is an extremely numerous number of images in the candidate image group in the image processing apparatus, if the visibility of the superimposed character object of all the candidate images is evaluated, it takes an enormous processing time. To deal with this, in the fifth embodiment, preprocessing is performed on the reduced image of the candidate image group to narrow down in advance the candidate image to which the image processing is applied. For example, the candidate image group obtainment unit 303 illustrated in FIG. 3 may perform the later-described filtering processing. The candidate image group obtainment unit 303 in the fifth embodiment obtains the reduced image of the candidate image group to be arranged in the document data and performs the filtering processing based on the edge strength on the reduced image.
(Processing Flow)

Figure 16:
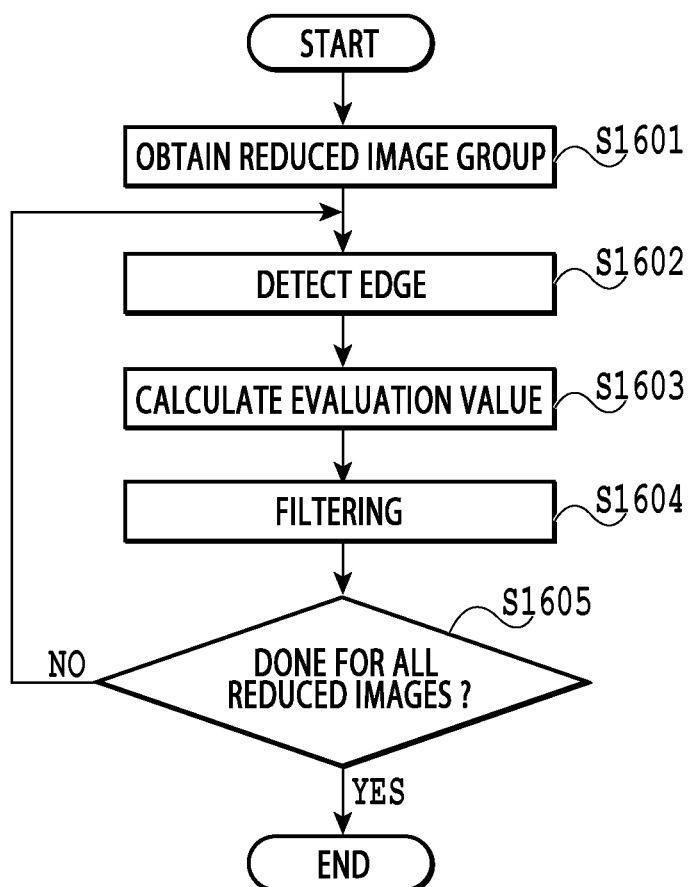
FIG. 16 is a flowchart of image processing according to a fifth embodiment of the present disclosure.

FIG. 16 illustrates a flowchart of the image processing according to the fifth embodiment of the present disclosure. In step S1601, the candidate image group obtainment unit 303 obtains the reduced image of the candidate image group as the input image. For example, in a case when the image search result from the external image provision website and the like, is used as the candidate image group, a thumbnail image created by the image provision website may be obtained.

In step S1602, the edge of the reduced image obtained in step S1601 is detected. The method of detecting the edge is the same as the processing described in step S505 in FIG. 5.

In step S1603, the edge strength evaluation value of each reduced image is calculated based on the edge of the reduced image calculated in step S1602. As the method of calculating the evaluation value, it is possible to use the method described in step S506 in FIG. 5.

In step S1604, whether the edge strength evaluation value calculated in step S1602 is smaller than a predetermined threshold is determined, and only the reduced image with the evaluation value less than the predetermined threshold is selected as a result of the filtering processing.

In step S1605, whether the processing for all the obtained reduced images ends is determined. If the processing does not end, the processing is restarted from step S1602 for the next reduced image. If the processing for all the reduced images ends, the filtering processing ends. Then, only the image object corresponding to the reduced image that is the result of the filtering processing selected in step S1604 is used as the candidate image group, and the processing described in the first embodiment to the third embodiment is executed.

Effect of Fifth Embodiment

It is possible to reduce the number of the candidate images by performing the preprocessing on the reduced image such as a thumbnail image of the candidate image group and excluding in advance the image object with a great edge strength. Accordingly, it is possible to speed up the processing to select the image object in which the visibility of the superimposed character object is not reduced.

Other Embodiments

Embodiment(s) of the present disclosure can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image processing method executed by an image processing apparatus to edit document data including an image on which a character object is superimposed, the method comprising:

obtaining a candidate image group that includes one or more candidate images, each being a candidate of an image to be arranged in the document data;

identifying, for each candidate image, a background region that is a background of the superimposed character object based on a size of the superimposed character object and a position of the superimposed character object in a case when the candidate image is arranged in the document data;

detecting an edge of the candidate image in the background region by using an edge filter and calculating a value related to an edge strength based on the detected edge; and causing a display to display one or more images with the calculated value related to the edge strength that is less than a predetermined threshold, wherein the one or more images are selected from images included in the candidate image group based on the calculated value and the predetermined threshold.

2. The image processing method according to claim 1, wherein the predetermined threshold is less than a value related to an edge strength of the superimposed character object.

3. The image processing method according to claim 1, wherein the predetermined threshold includes a plurality of thresholds, and, out of the plurality of thresholds, a value depending on a size of the character object is used.

4. The image processing method according to claim 1, wherein the predetermined threshold includes a plurality of thresholds, and, out of the plurality of thresholds, a value depending on an attribute of the character object is used.

5. The image processing method according to claim 1, further comprising obtaining a rendering image in which an object, to which a transparency is set, is superimposed on the candidate image in a case when the object, to which the transparency is set, is arranged between a region of the image arranged in the document data and the character object, wherein, in the calculating the value, the value related to the edge strength of the background region in the rendering image is calculated.

6. The image processing method according to claim 1, further comprising obtaining a rendering image rendered with the superimposed character object in a case when the candidate image is arranged in the document data, wherein, in the calculating the value, another value related to another edge strength of the background region in the rendering image is calculated, and, in the selecting, the selected image is selected by using the other value as the predetermined threshold.

7. The image processing method according to claim 6, wherein, in the obtaining the rendering image, in a case when the superimposed character object is decorated, the decoration is also rendered.

8. The image processing method according to claim 1, further comprising obtaining a criterion image arranged in document data as a criterion, wherein, in the identifying the background region, in a case when the criterion image is arranged in the document data, a region as a background of the superimposed character object is identified as a second background region, in the calculating the value, an edge of the criterion image in the second background region is detected, and a criterion value is calculated based on the detected edge, and, in the selecting, the selected one or more images are selected by using the criterion value as the predetermined threshold.

9. The image processing method according to claim 1, wherein, in the identifying the background region, a height or a width of the candidate image is processed to be arranged so as to coincide with a height or a width of a region of an image arranged in the document data.

10. The image processing method according to claim 1, wherein, in the identifying the background region, a main object of the candidate image is detected, and processing for arrangement is performed such that the main object is positioned in a center of a region of an image arranged in the document data.

11. The image processing method according to claim 9, wherein the processing is scaling processing.

12. The image processing method according to claim 9, wherein the processing is trimming processing.

13. The image processing method according to claim 1, wherein the obtaining of the candidate image group includes:

obtaining a reduced image of the candidate image;

calculating a value related to an edge strength of the reduced image as a third value;

selecting a reduced image in which the third value is smaller than a predetermined threshold; and obtaining a candidate image corresponding to the selected reduced image.

14. The image processing method according to claim 1, wherein the value related to the edge strength is a representative value of a feature amount obtained based on the detected edge.

15. The image processing method according to claim 14, wherein the representative value is any one of average value, maximum value, minimum value, mode value, and median value.

16. An image processing apparatus configured to edit document data including an image on which a character object is superimposed, the apparatus comprising:

one or more processors; and one or more memories storing instructions that, when executed by the one or more processors, cause the image processing apparatus:

to obtain a candidate image group that includes one or more candidate images, each being a candidate of an image to be arranged in the document data;

to identify, for each candidate image, a background region that is a background of the superimposed character object based on a size of the superimposed character object and a position of the superimposed character object in a case when the candidate image is arranged in the document data;

to detect an edge of the candidate image in the background region by using an edge filter and calculating a value related to an edge strength based on the detected edge; and to cause a display to display one or more images with the calculated value related to the edge strength that is less than a predetermined threshold, wherein the one or more images are selected from images included in the candidate image group based on the calculated value and the predetermined threshold.

17. A non-transitory computer readable storage medium storing a program that causes a computer to execute an image processing method to edit document data including an image on which a character object is superimposed, the method comprising:

obtaining a candidate image group that includes one or more candidate images, each being a candidate of an image to be arranged in the document data;

identifying, for each candidate image, a background region that is a background of the superimposed character object based on a size of the superimposed character object and a position of the superimposed character object in a case when the candidate image is arranged in the document data;

detecting an edge of the candidate image in the background region by using an edge filter and calculating a value related to an edge strength based on the detected edge; and causing a display to display one or more images with the calculated related to the edge strength that is less than a predetermined threshold, wherein the one or more images are selected from images included in the candidate image group based on the calculated value and the predetermined threshold.

* * * * *